INVENTORS
HAROLD E. BARRETT, JR.
BERNARD N. DICKINSON
BY William H. Pittman

United States Patent Office

3,420,709
Patented Jan. 7, 1969

3,420,709
LIQUID PURIFICATION BY ADSORPTION
Harold E. Barrett, Jr., Berkeley, and Bernard N. Dickinson, Redwood City, Calif., assignors to Diamond Shamrock Corporation, a corporation of Delaware
Filed Apr. 29, 1965, Ser. No. 451,781
U.S. Cl. 127—53                 11 Claims
Int. Cl. C13d 3/14; C13d 3/14

ABSTRACT OF THE DISCLOSURE

A method of liquid purification in which insoluble synthetic resins, many being ion-exchange resins, are used as adsorbents in combination with prior, known adsorbents, such as activated carbon. The combination exhibits an improved purification effect when compared with that of the prior adsorbents alone, which effect increases with decreasing particle size of adsorbents.

---

Figure 1:
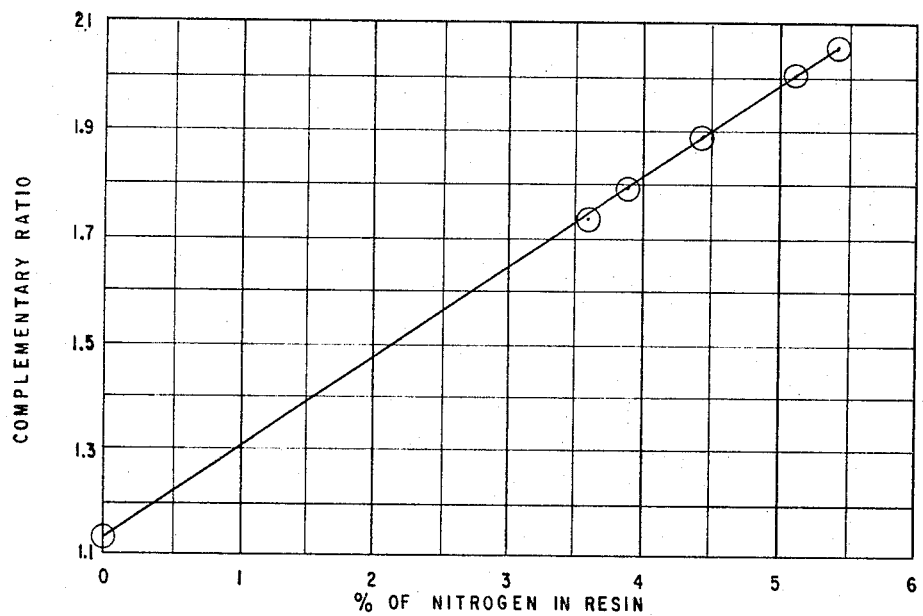

This invention relates to purification methods, and more particularly to an improved adsorption method for the removal of impurities from liquids.

Purification methods for liquids are of paramount importance in the chemical industry, especially in the purification of water and the processing of materials for consumer use such as foodstuffs and edible goods in general. It is particularly necessary to remove impurities which are colored or which are precursors of color-bearing materials, since colored impurities have a highly adverse effect on consumer acceptability. It has long been known that impurities may be removed by adsorption on such substances as activated carbon and natural clays (e.g., kaolin and bentonite). Use of these adsorbents is widespread, especially in the sugar industry where activated carbon is used in large quantities for the purification of sugar solutions.

Ion exchange resins may also be used as adsorbents. For example, U.S. Patent 2,785,998 describes a method for the removal of color bodies which comprises passing the solution to be decolorized through a bed of an anion exchange resin containing ammonium groups. Similarly, an article by I. M. Abrams and B. N. Dickinson in Industrial and Engineering Chemistry, vol. 41, page 2521 (1949), describes the use of anion exchange resins for removing color from sugar solutions. Ion exchange resins are widely used in various phases of the sugar purification process, but their use in decolorization is disadvantageous because of their high cost; activated carbon is more economical for this purpose but is itself relatively expensive, as are other adsorbents. Therefore, it is of interest to find ways to increase the efficiency of such adsorbents so that smaller quantities can be used to provide efficient purification.

A principal object of the present invention, therefore, is to provide an improved adsorption method for the purification of liquids.

Another object is to improve the efficiency and decrease the cost of adsorptive purification methods by providing a method whereby small quantities of adsorbent material will provide the same degree of purification previously provided by larger quantities thereof.

Still another object is to provide improved compositions for adsorptive purification of liquids.

Other objects will in part be obvious and will in part appear hereinafter.

The present invention is based on the unexpected finding that two or more adsorbents of fine particle size, when used in combination for the removal of impurities from liquids, often complement each other's actions so that substantially more adsorption, purification, or refining may be accomplished than by the use of any of the component adsorbents individually. Thus, for example, the capacity for adsorption of impurities of a given weight of activated carbon when combined with a fraction of its weight of a second adsorbent, such as a synthetic resin containing polar groups, may be two or three times, or more, the capacity of the same weight of activated carbon used alone. This phenomenon is referred to hereinafter in this specification as the "complementary effect."

Based on this finding, the present invention is directed to a method for the purification of a liquid which comprises contacting said liquid with at least two different finely divided adsorbents selected from the group consisting of activated carbon, synthetic resins containing polar groups, and inorganic adsorbents; agitating said liquid in contact with said adsorbents until the desired degree of purification is achieved, and separating the purified liquid from said adsorbents.

The method of this invention is applicable for the removal of impurities from a wide variety of liquids. Principal applications, however, are in the removal of color bodies, color precursors and haze from sugar solutions and from water. It has previously been necessary to use single adsorbents in large quantities for the decolorization of impure water and aqueous sugar solutions in order to produce a commercially attractive product. By using the method of this invention, the same degree of purification may be accomplished by considerably smaller quantities of adsorbents.

Adsorbent materials suitable for use in the method of this invention comprise activated carbon; inorganic adsorbents such as kaolin, calcium phosphate gel, magnesium silicate, and amine-modified clays sold under the trade name "Bentone"; and synthetic resins containing polar groups. The term "polar groups" as used in the present specification is intended to refer to ionic groups such as are present in ion exchange resins, and also radicals such as hydroxyl, nitro and amide which, though having a substantial separation of charges, possess no ion exchange properties or exhibit such properties only under severe conditions (e.g., high alkalinity or the like). Although ion exchange resins are among the preferred adsorbents and reference thereto is frequently made throughout this specification, the presence of ion exchange properties is not essential.

From a purely operative standpoint, the weight ratio of the adsorbents used for purification of a given liquid is not critical. Thus, in a two-adsorbent mixture one of the constituents may be used in weight preponderance, or the two may be used in equal amounts. Usually, however, it is desirable for economic reasons to use a predominant amount (e.g., about 75–95% by weight) of a natural adsorbent such as carbon and a smaller amount (e.g., about 5–25% by weight) of a synthetic adsorbent such as an ion exchange resin. In this specification, the adsorbent present in greater amount will be termed the "principal adsorbent" and the other as the "complementary adsorbent."

The preferred compositions of this invention contain, as the principal adsorbent, activated carbon, and as the complementary adsorbent, an ion exchange resin. In general, the term "ion exchange resin" refers to crosslinked, insoluble and infusible polymers which contain polar groups such as amine, quaternary ammonium, sulfonium, phosphonium, carboxylic acid, sulfonic acid, phosphonic acid, phosphonous acid and the like. Anion exchange resins containing sulfur or nitrogen, especially sulfonium, amine and ammonium groups, are particularly desirable as complementary adsorbents; examples of suitable nitrogen-containing adsorbents are amine-aldehyde resins, phenol-aldehydeamine resins, aminated resins of styrene and other vinyl monomers, and the like.

All of these resins are well known in the art and are disclosed in a number of United States and other patents.

It is essential that the adsorbents be of small particle size. While activated carbon and most inorganic adsorbents are normally finely-divided, ion exchange resins usually exist as large granules. For the purpose of this invention, these granules must be "micronized"—that is, reduced to an average particle size below about 200 microns, preferably about 1–120 microns. Above this size, the adsorbents show little if any complementary effect under reasonable conditions of use.

Contrary to what might be expected, no measurable relationship has been found between total surface area of the adsorbent particles (as measured by the Brunauer-Emmett-Teller nitrogen adsorption method) and complementary effect. Thus, it is apparently not necessary that the adsorbents be macroporous.

Liquid-adsorbent contact time and temperature may be varied according to the adsorbents used and the liquids being purified. In general, a contact time of about 15–60 minutes and a temperature of about 50–80° C. have been found preferable for the decolorization of sugar syrups. Shorter or longer adsorption times and lower temperatures are often desirable, however, in particular, water purification is best effected at ambient temperature and over periods of one hour or more. In any event, the contact time should be such that the system can approach adsorption equilibrium—that is, the steady state at which the rates of adsorption and desorption are equal. Although complete equilibration is usually not necessary, the contact time should be such that it may at least be approached—e.g., to about 80% or more.

Mere passage of the liquid to be purified through an adsorbent bed is not practical for the process of the present invention. In the first place, a very deep bed is required for adequate contact time, and the flow rate through a deep bed of micronized adsorbent is so slow as to be uneconomical. In the second place, costs of installation and maintenance of a suitable column are high. Thus, non-columnar contact methods are necessary, and any such method may be used which will provide the necessary contact time. For example, the liquid may be agitated with each of the adsorbents in turn, with separation from one adsorbent before contact with the next. Or the liquid may be agitated with the first adsorbent and subsequent ones may then be introduced, separation being effected only after all adsorbents have been added. Preferably, however, the adsorbents are simultaneously introduced into the liquid as a mixture and contact takes place with all of them at once. It is generally found that the magnitude of the complementary effect is greater when there is substantial contact of the liquid with all the adsorbents at once—that is, when the adsorbents are present as a mixture rather than separately for at least a portion of the total contact time. However, the term "contacting" as used in the specification and claims is general in meaning and embraces all methods of contact which satisfy the conditions set forth hereinabove.

For the purpose of measuring and evaluating the magnitude of the complementary effect, a numerical quotient referred to herein as the "complementary ratio" is used. When applied to an adsorptive system comprising a major amount of carbon and a minor amount of an anion exchange resin or other complementary adsorbent, the complementary ratio is defined as the quotient obtained by dividing the weight of carbon in the adsorbent mixture into the weight of carbon used alone which is required to provide the same degree of impurity removal. For example, if a mixture of 1 gram of activated carbon with 0.1 gram of a given anion exchange resin provides color removal equal to 3 grams of the same carbon when used alone, the complementary ratio of that mixture is 3.0.

Figure 2:
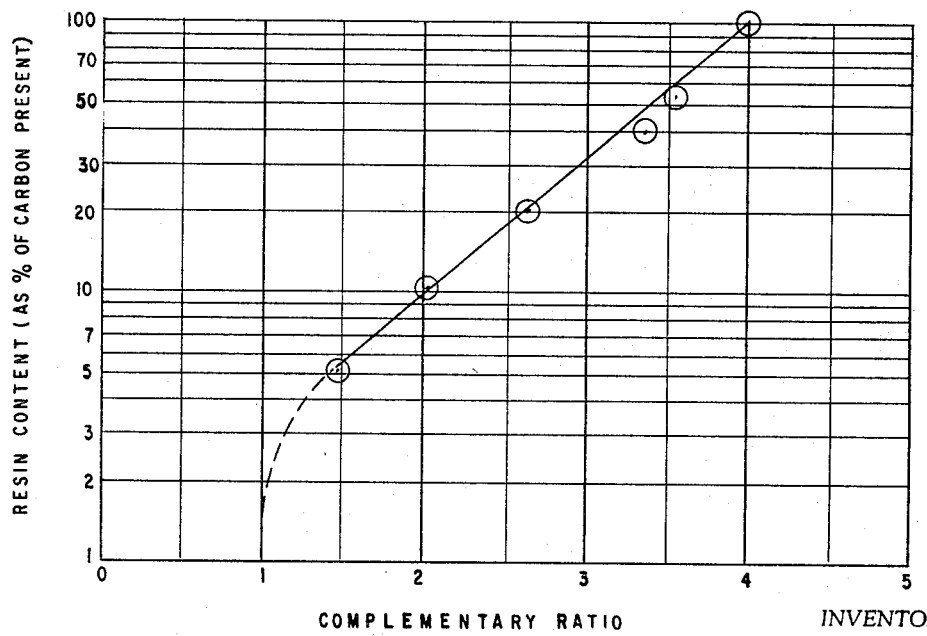

FIGURES 1 and 2 illustrate the relationship of complementary ratio to the concentration of ion exchange groups in the adsorbent mixture and to the proportion of complementary adsorbent in the mixture. The results given are for the purification of "process greens," a molasses spun off following the crystallization of dextrose from a high dextrose equivalent starch hydrolyzate, as described in Example 1 hereinafter, using a mixture of Duolite LAD–504A resin and carbon. As is shown by FIGURE 1, for a given adsorbent mixture the complemetary ratio afforded by a mixture of 1.0% carbon and 0.1% resin (based on solids content of the molasses substrate) is directly proportional to the percentage of nitrogen in the complementary adsorbent, and thus to the concentration of anion exchange groups therein. FIGURE 2 shows that, for the decolorization of "process greens," a linear relationship exists between complementary ratio and the logarithm of the weight ratio of complementary to principal adsorbent. Thus, it will be seen that an increase in complementary effect may be obtained either by increasing the proportion of complementary adsorbent in the mixture or by using a adsorbent containing a higher concentration of functional groups.

While the description hereinabove has been based on the use of two adsorbents in combination, more than two can be used if desired. Indeed, it is often found that three-component adsorbent mixtures are more effective than two-component mixtures containing the same amount of complementary adsorbent, showing that the complementary effect increases with increasing diversity in the adsorbent mixture. Moreover, additional ingredients may be added to accomplish other purposes if desired; for example, a purely ion exchange material may be present if it is advantageous to effect removal or separation of other substances by ion exchange.

In the examples hereinafter, a number of adsorbent materials are referred to by brand name. The chemical nature of each of these materials is as follows:

| | |
|---|---|
| Nuchar C–190N, CEE, Darco S–51 | Activated carbon adsorbents. |
| Duolite LAD–499 | Phenol - formaldehyde - ammonia resin. |
| Duolite LAD–500 | Phenol - formaldehyde - polyethylene-amine resin. |
| Duolite LAD–501 | Epichlorohydrin - polyethyleneamine condensate. |
| Duolite LAD–502 | Crosslinked polystyrene resin with quaternary trimethylammonium active groups (Type I). |
| Duolite LAD–504A, 504H, 504M | Aminated phenol - formaldehyde resins containing progressively higher nitrogen concentrations in the order 504<504H<504M. |
| Duolite LAD–505 | Crosslinked polystyrene resin with sulfonium active groups. |
| Duolite LAD–506 | Urea - formaldehyde - ammonia condensate. |
| Duolite LAD–507 | Crosslinked polystyrene resin with sulfonic acid active groups. |
| Duolite LAD–508 | Melamine - formaldehyde condensate. |
| Duolite LAD–509 | Crosslinked polystyrene resin with quaternary dimethylethanol - ammonium active groups (Type II). |
| Duolite LAD–510 | Crosslinked polyacrylamide-polyamine condensate. |
| Duolite LAD–511 | Melamine - guanidine-formaldehyde condensate. |
| Duolite LAD–512 | Guanidine-formaldehyde condensate. |
| Amberlite IRA–93 | Styrene - divinylbenzene resin with tertiary amine groups. |

DEAE–Sephadex _____ Dextran crosslinked with epichlorohydrin or formaldehyde and activated so as to contain the diethylaminoethyl group.
Britesorb 30 _____ Adsorptive magnesium silicate.
Processed silica rock ___ A porous natural siliceous ore which has been washed with water and dried.

The invention is illustrated by the following examples. In each example, resins and other adsorbents of large particle size are ground to an average particle diameter of 200 microns or less in a ball mill or other suitable attrition apparatus. All percentages are by dry weight and are based on the weight of solids in the material being purified (in the case of sugar solutions) or on the total weight of the material being purified (in the case of water and organic substances).

Degree of purification is measured by placing the test liquid in a spectrophotometer cell, allowing it to stand for 10 minutes until it becomes quiescent, and then reading optical density at 450 millimicrons to determine "total color." A second reading is taken at 600 millimicrons to determine the apparent color resulting from light scattering or haze. The ambient color reading is equal to the difference between the optical densities at 450 and 600 millimicrons.

The test sample is compared with the control samples to determine which of the latter has the same ambient color value, and the weight of principal adsorbent in the corresponding control is then divided by the weight of principal adsorbent in the test sample to determine the complementary ratio. In cases where neither adsorbent is charcoal, a second figure gives the ratio of the weight of carbon required for equivalent purification to the weight of adsorbents actually used. Results are as follows.

| Principal Adsorbent | Dry, Percent | Complementary Adsorbent | Dry, Percent | Complementary Ratio |
|---|---|---|---|---|
| Nuchar C-190N | 1.0 | Duolite LAD-499 (moist) | 0.1 | 1.9 |
| Nuchar C-190N | 1.0 | Duolite LAD-500 (dry) | 0.1 | 2.66 |
| Do | | Duolite LAD-500 (moist) | 0.1 | 1.9 |
| Do | | ____do____ | 0.2 | 2.75 |
| Nuchar C-190N | 1.0 | Duolite LAD-501 (dry) | 0.1 | 1.97 |
| Do | | Duolite LAD-501 (moist) | 0.1 | 2.00 |
| Nuchar C-190N | 1.0 | Duolite LAD-502 (dry) | 0.1 | 2.43 |
| Do | | Duolite LAD-502 (moist) | 0.1 | 2.32 |
| Nuchar C-190N | 1.0 | Duolite LAD-504A (moist) | 0.1 | 1.9 |
| Do | | ____do____ | 0.2 | 2.75 |
| Nuchar C-190N | 1.0 | Duolite LAD-504H (moist) | 0.1 | 2.65 |

Example 1

Process greens, a molasses spun off following the crystallization of dextrose from a high dextrose equivalent starch hydrolyzate, containing 37% solids and having a pH of 4.0, is purified by the following method. The appropriate adsorbents are weighed into a 20 ml. vial containing a short section of glass rod to aid in agitation, and the liquid to be purified is added. The vial is closed and shaken on a vibratory mixer for 3–5 minutes. It is then attached to a horizontal rotating shaft in a constant temperature bath at 80° C., and rotated at 88 r.p.m. for 15 minutes. For comparison purposes, a number of controls are run containing various percentages of the principal adsorbent alone. At the end of the agitation period, the vial is chilled in an ice bath and the solution is removed by filtration through Whatman No. 42 filter paper.

Example 2

NuSweet E, a commercial glucose syrup produced by acid-enzyme hydrolysis of corn starch, is decolorized by the method of Example 1. Duolite LAD-500 is supplied dry; all other resins are supplied moist. The contact time is 30 minutes and contact temperature is 60° C. Results are as follows.

| Principal Adsorbent | Dry, Percent | Complementary Adsorbent | Dry, Percent | Complementary Ratio |
|---|---|---|---|---|
| Nuchar CEE | 1.0 | Duolite LAD-500 | 0.1 | 2.7 |
| Do | 1.0 | Duolite LAD-504A | 0.1 | 3.0 |
| Do | 0.8 | Duolite LAD-504H | 0.08 | 4.75 |
| Do | 0.6 | ____do____ | 0.06 | 5.44 |
| Do | 0.4 | ____do____ | 0.04 | 4.65 |
| Do | 0.8 | Duolite LAD-505 | 0.04 | 2.19 |
| Do | 0.4 | ____do____ | 0.02 | 2.76 |
| Do | 0.8 | Duolite LAD-504H / Duolite LAD-505 | 0.08 / 0.04 | 5.75 |
| Do | 0.4 | Duolite LAD-504H / Duolite LAD-505 | 0.04 / 0.02 | 5.57 |
| Do | 0.8 | Duolite LAD-507 | 0.2 | 1.32 |

Example 3

To determine the degree of removal of color precursors by the method of this invention, a number of the samples of Example 3 are heated at 100° C. for one hour. The color which develops thereby is measured and color remaining after adsorbent treatment is subtracted. All resins are supplied moist. Results are given below; it can be seen that the method is also effective for removal of color precursors.

| Principal Adsorbent | Dry, percent | Complementary Adsorbent | Dry, percent | Precursor Complementary Ratio |
|---|---|---|---|---|
| Nuchar CEE | 1.0 | Duolite LAD-504A | 0.1 | 3.0 |
| Do | 0.8 | ____do____ | 0.08 | 4.25 |
| Do | 0.8 | Duolite LAD-505 | 0.04 | 2.19 |
| Do | 0.8 | Duolite LAD-507 | 0.2 | 1.91 |
| Do | 0.8 | Duolite LAD-504H / Duolite LAD-405 | 0.08 / 0.04 | 5.88 |

Example 4

NuSweet E is treated as in Example 2 with a mixture of 0.6% Nuchar CEE and 0.06% of Duolite LAD–504A, 504H and 504M—aminated resins containing progressively greater nitrogen percentages and hence progressively more active amine groups. The results show the effect of increasing active group concentrations on complementary ratio.

| Complementary adsorbent: | Complementary ratio |
|---|---|
| Duolite LAD–504A | 3.04 |
| Duolite LAD–504H | 3.50 |
| Duolite LAD–504M | 5.20 |

Example 5

To evaluate the method of this invention for the removal of impurities which elude normal sugar refining procedures, a refined beet sugar available to consumers is melted to a gravity of 52.8° Brix, adjusted to a pH of 7.05 and treated by the method of Example 1 for 30 minutes at 60° C. Duolite LAD–500 and LAD–501 are supplied dry; all other resins are supplied moist. The following results are obtained.

| Principal Adsorbent | Dry, Percent | Complementary Adsorbent | Dry, Percent | Complementary Ratio |
|---|---|---|---|---|
| Darco S–51 | 1.0 | Duolite LAD–500 | 0.1 | 6.00 |
| Do | 1.0 | Duolite LAD–504H | 0.1 | 5.38 |
| Do | 1.0 | Duolite LAD–508 | 0.1 | 3.43 |
| Do | 1.0 | $Ca_3(PO_4)_2$ gel | 0.1 | 2.81 |
| Duolite LAD–501 | 0.5 | Duolite LAD–500 | 0.1 | 1.65 / [1] 3.66 |
| Do | 0.5 | Duolite LAD–504H | 0.1 | .81 / [1] 24.4 |
| Do | 0.5 | Duolite LAD–505 | 0.1 | 1.31 / [1] 3.21 |
| Do | 0.5 | Duolite LAD–508 | 0.1 | 9.32 / [1] 8.27 |

[1] Based on Nuchar CEE.

Example 6

The technique of Example 1 is used on a raw cane sugar melt which has been clarified by passage through a bone char filter. The gravity of the melt is 52° Brix. All resins are supplied moist. Contact is effected for 30 minutes 60° C. Removal of ambient color is measured at three different pH's and removal of color precursors (by the method of Example 3) at two pH's. Results are as follows.

| pH | Principal Adsorbent | Dry, Percent | Complementary Adsorbent | Dry, Percent | Complementary Ratio Ambient Color | Color Precursors |
|---|---|---|---|---|---|---|
| 6.0 | Nuchar CEE | 1.0 | Duolite LAD–504A | 0.1 | 1.98 | 1.86 |
| 7.0 | do | 1.0 | do | 0.1 | 1.72 | 1.75 |
| 7.85 | do | 1.0 | do | 0.1 | 1.18 | |
| 6.0 | do | 1.0 | Duolite LAD–504H | 0.1 | 2.96 | 3.08 |
| 7.0 | do | 1.0 | do | 0.1 | 2.88 | 2.06 |
| 7.85 | do | 1.0 | do | 0.1 | 3.07 | |

Example 7

Removal of ambient color and haze from Clinsweet "M," a commercial glucose syrup obtained by acid-enzyme hydrolysis of a corn starch slurry, is evaluated by treatment for 30 minutes at 60° C. according to the method of Example 1. Haze is measured by light transmission at 600 millimicrons. A mixture of 0.5% Nuchar CEE and 0.05% Duolite LAD–504A gives a complementary ratio of 3.6 for ambient color and 18 for haze.

Example 8

Removal of ambient color from NuSweet E is measured under the following conditions: (1) adsorbents added, equilibrated and removed together; (2) carbon added and equilibrated, then resin added and equilibrated, followed by removal of both; (3) resin added and equilibrated, then carbon added and equilibrated, followed by removal of both; (4) carbon added, equilibrated and removed followed by the same procedure with resin; (5) resin added, equilibrated and removed followed by the same procedure with carbon. All resins are supplied moist, and each equilibration period is 30 minutes at 60° C. The results, given below, show that the complementary ratio is markedly higher when there is simultaneously liquid contact with resin and carbon, and also that when there is no such simultaneous contact the order of addition of the adsorbents has a significant effect.

| Mode of Addition | Principal Adsorbent | Dry, Percent | Complementary Adsorbent | Dry, Percent | Complementary Ratio |
|---|---|---|---|---|---|
| 1 | Nuchar CEE | 0.8 | Duolite LAD–504H | 0.08 | 4.76 |
| 4 | do | 0.8 | do | 0.08 | 2.62 |
| 5 | do | 0.8 | do | 0.08 | 3.40 |
| 1 | do | 0.8 | Duolite LAD–504H / Duolite LAD–505 | 0.08 / 0.04 | 5.5 |
| 2 | do | 0.8 | Duolite LAD–504H / Duolite LAD–505 | 0.08 / 0.04 | 5.63 |
| 3 | do | 0.8 | Duolite LAD–504H / Duolite LAD–505 | 0.08 / 0.04 | 5.63 |
| 4 | do | 0.8 | Duolite LAD–504H / Duolite LAD–505 | 0.08 / 0.04 | 2.86 |
| 5 | do | 0.8 | Duolite LAD–504H / Duolite LAD–505 | 0.08 / 0.04 | 3.61 |

Example 9

When process greens are treated for 60 minutes at 60° C. according to the method of Example 1 with a mixture of 1.0% Nuchar C–190N and 0.33% of either Duolite LAD–500 or LAD–504A (supplied moist) alone, a complementary ratio of 7.56 is obtained. With a mixture of 1.0% Nuchar C–190N, 0.3% of Duolite LAD–504A (supplied moist) and 0.03% of Duolite LAD–500 (supplied dry), a complementary ratio of 9.56 is obtained.

Thus, it is seen that mere quantity is secondary to diversity of properties as related to a complementary adsorbent or combination of complementary adsorbents.

Example 10

A sample of crude dicyclopentadiene containing yellow impurities is purified by the method of Example 1 using 1.0% Nuchar C-190N with 0.1% of a number of complementary adsorbents, supplied dry. Contact time and temperature are 30 minutes at 60° C. The results, given in the following table, show the effectiveness of the method of this invention for the purification of organic liquids.

Complementary adsorbent:       Complementary ratio
    Duolite LAD-500 _____ 2.0
    Duolite LAD-504H _____ 2.1
    Duolite LAD-505 _____ 2.0
    $Ca_3(PO_4)_2$ gel _____ 2.0

Example 11

A highly colored pond water containing a large organic content is adjusted to a pH of 7 and treated with adsorbent mixtures by the method described in Example 1. Treatment is carried out at a temperature of 60° C. and the contact time is 30 minutes. The following results are obtained.

| Principal Adsorbent | Dry, Percent | Complementary Adsorbent | Dry, Percent | Complementary Ratio |
|---|---|---|---|---|
| Nuchar CEE | 1.0 | Duolite LAD-500 (dry) | 0.1 | 3.38 |
| Do | 1.0 | Duolite LAD-501 (dry) | 0.1 | 4.96 |
| Do | 1.0 | Duolite LAD-502 (dry) | 0.1 | 2.76 |
| Nuchar C-190N | 1.0 | Duolite LAD-504H (moist) | 0.1 | 5.98 |
| Nuchar CEE | 0.5 | Duolite LAD-504M (moist) | 0.05 | 7.24 |
| Nuchar C-190N | 1.0 | Duolite LAD-505 (moist) | 0.1 | 7.75 |
| Nuchar CEE | 0.4 | ___do___ | 0.05 | 10.0 |
| Nuchar C-190N | 0.5 | Duolite LAD-506 (moist) | 0.05 | 2.04 |
| Darco S-51 | 1.0 | Duolite LAD-509(OH) (dry) | 0.1 | 3.18 |
| Do | 1.0 | Duolite LAD-509 (OH) (moist) | 0.1 | 3.18 |
| Do | 1.0 | Duolite LAD-509(Cl) (dry) | 0.1 | 4.41 |
| Do | 1.0 | Duolite LAD-509(Cl) (moist) | 0.1 | 3.18 |
| Do | 0.7 | Duolite LAD-509(Cl) (dry) | 0.07 | 3.63 |
| Do | 0.5 | ___do___ | 0.05 | 3.44 |
| Do | 0.5 | Duolite LAD-510 (dry) | 0.05 | 2.72 |
| Do | 0.5 | Duolite LAD-510 (moist) | 0.05 | 2.68 |
| Nuchar CEE | 1.0 | Duolite LAD-511 (dry) | 0.1 | 3.3 |
| Do | 1.0 | Processed silica rock | 0.1 | 1.58 |
| Darco S-51 | 1.0 | Duolite LAD-512 (moist) | 0.1 | 3.94 |
| Do | 1.0 | Amberlite IRA-93 (moist) | 0.1 | 2.26 |
| Do | 1.0 | Amberlite IRA-93 (dry) | 0.1 | 1.50 |
| Nuchar CEE | 1.0 | DEAE-Sephadex (dry) | 0.1 | 4.5 |
| Duolite LAD-504H (moist) | 0.4 | Nuchar CEE | 0.1 | 2.1 |
| Do | 0.2 | Duolite LAD-505 (dry) | 0.04 | { 4.4 / ¹7.9 } |
| Duolite LAD-500 (dry) | 0.5 | Duolite LAD-502 (dry) | 0.1 | { 2.54 / ¹1.69 } |
| Do | 0.5 | Duolite LAD-505 (moist) | 0.1 | { 2.16 / ¹1.47 } |
| Do | 0.5 | Britesorb 30 | 0.1 | { 5.38 / ¹4.16 } |
| Nuchar CEE | 1.0 | { Duolite LAD-504A (moist) / Duolite LAD-500 (dry) } | { 0.08 / 0.02 } | 9.22 |
| Do | 1.0 | { Duolite LAD-504H (moist) / Duolite LAD-500 (dry) } | { 0.08 / 0.02 } | 9.74 |

Example 12

A pond water similar to that treated in Example 11 is treated for 180 minutes at ambient temperature with adsorbent mixtures consisting of 1.0% Nuchar C-190N and 0.1% resin. The results are as follows.

Resin:                      Complementary ratio
    Duolite LAD-500 (dry) _____ 5.3
    Duolite LAD-502 (moist) _____ 9.0
    Duolite LAD-504A (moist) _____ 3.0
    Duolite LAD-504H (moist) _____ 8.2
    Duolite LAD-504M (moist) _____ 7.0
    Duolite LAD-505 (moist) _____ 9.0

It is to be understood that the invention is not limited by the specific examples and embodiments described hereinabove, but includes such changes and modifications as may be apparent to one skilled in the art upon reading the appended claims.

What is claimed is:

1. A method for the adsorptive purification of a liquid which comprises contacting said liquid with a mixture of at least two different finely divided adsorbents selected from the group consisting of activated carbon; cross-linked insoluble synthetic adsorbent resins containing polar groups consisting of amine, quaternary ammonium, sulfonium, sulfonic acid, carboxylic acid, hydroxyl or nitro; and inorganic adsorbents, said inorganic adsorbents being selected from the group consisting of kaolin, calcium phosphate gel, magnesium silicate, amine-modified clays and processed silica rock, agitating said liquid in contact with said adsorbents until approximately 80% of adsorption equilibrium is reached and filtering the liquid to remove said adsorbents and adsorbed impurities, said adsorbents having a particle size of less than 120 microns.

2. The method of claim 1 wherein the liquid is a sugar solution containing at least one of the group consisting of colored impurities, color precursors and haze producing materials.

3. The method of claim 1 wherein the liquid is water containing impurities.

4. The method of claim 1 wherein the mixture of adsorbents consists of activated carbon as the major adsorbent and a cross-linked insoluble synthetic adsorbent resin as the minor adsorbent.

5. The method of claim 4 wherein the contact time is about 15–60 minutes and the contact temperature is about 50–80° C.

6. The method of claim 4 wherein the synthetic resin is an anion exchange resin containing an element selected from the group consisting of nitrogen and sulfur.

7. The method of claim 4 wherein the liquid to be purified is an aqueous sugar solution containing at least one of the group consisting of colored impurities, color precursors and haze producing materials.

8. The method of claim 4 wherein the liquid is water containing impurities.

9. A method for the adsorptive removal of colored impurities, color precursors and haze producing materials from an aqueous solution which comprises contacting said solution with a finely divided adsorbent mixture containing a major amount of activated carbon and a minor amount of a cross-linked insoluble synthetic adsorbent resin containing nitrogen; agitating said solution in contact with said adsorbent mixture until approximately 80% of adsorption equilibrium is achieved and filtering the purified solution to remove said adsorbent mixture and adsorbed impurities, said adsorbents having an average particle size of less than 120 microns.

10. The method of claim 9 wherein the contact time is about 15–60 minutes and the contact temperature is about 50–80° C.

11. A method for the adsorptive removal of impurities from water which comprises contacting said water with a finely divided adsorptive mixture containing a major amount of activated carbon and a minor amount of a cross-linked insoluble synthetic adsorbent resin containing nitrogen; agitating said water in contact with said adsorbent mixture until approximately 80% of adsorption equilibrium is achieved and filtering the purified water to remove said adsorbent mixture and adsorbed impurities, said adsorbents having an average particle size of less than 120 microns.

References Cited

UNITED STATES PATENTS

| | | | |
|---|---|---|---|
| 2,191,365 | 2/1940 | Boyd | 127—46.1 |
| 2,261,920 | 11/1941 | Graff et al. | 127—55 |
| 2,490,716 | 12/1949 | Smith et al. | 127—46.1 X |
| 2,595,290 | 5/1952 | Quinn | 252—177 |
| 2,600,085 | 6/1952 | Van Dyk | 99—48 X |
| 3,197,338 | 7/1965 | Hurst et al. | 127—40 |
| 3,223,619 | 12/1965 | Calmon et al. | 210—24 |

FOREIGN PATENTS 246,311   8/1963   Australia.

OTHER REFERENCES

Weaver, H. E., et al.: Commercial-Scale Ion Exchange Produces Superior Crystalline and Liquid Sugars, Sugar y Azucar, August 1958, pp 27–30. (Photostat copy in Group 171), 127–46.1.

MORRIS O. WOLK, *Primary Examiner.*

D. G. CONLIN, *Assistant Examiner.*

U.S. Cl. X.R.

127—46, 55; 210—36, 39, 502, 503